(12) United States Patent
Khamis et al.

(10) Patent No.: US 12,393,909 B2
(45) Date of Patent: Aug. 19, 2025

(54) FIADAPTIVE MULTI-MODAL E-PALLET CONTROL

(71) Applicant: GM GLOBAL TECHNOLOGY OPERATIONS LLC, Detroit, MI (US)

(72) Inventors: Alaa M. Khamis, Courtice (CA); Steffen P Lindenthal, Oshawa (CA); Hojjat Izadi, North York (CA); Michael D. Alarcon, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 457 days.

(21) Appl. No.: 18/171,784

(22) Filed: Feb. 21, 2023

(65) Prior Publication Data

US 2024/0281757 A1 Aug. 22, 2024

(51) Int. Cl.
*G06Q 10/087* (2023.01)
(52) U.S. Cl.
CPC ............................... *G06Q 10/087* (2013.01)
(58) Field of Classification Search
CPC .................................................. G06Q 10/087
See application file for complete search history.

(56) References Cited

U.S. PATENT DOCUMENTS

| | | | | |
|---|---|---|---|---|
| 11,459,221 | B2* | 10/2022 | Levasseur | B66F 9/142 |
| 11,491,643 | B2* | 11/2022 | Skaaksrud | G05D 1/225 |
| 12,084,104 | B1* | 9/2024 | Alameh | G06Q 10/087 |
| 2015/0205298 | A1* | 7/2015 | Stoschek | B60W 40/02 |
| | | | | 901/1 |
| 2017/0213164 | A1* | 7/2017 | Rainbolt | G06Q 10/02 |
| 2019/0171218 | A1* | 6/2019 | Hammond | G05D 1/0223 |
| 2019/0196470 | A1* | 6/2019 | Kaneko | G06Q 30/0269 |
| 2019/0287063 | A1* | 9/2019 | Skaaksrud | G06Q 10/0832 |
| 2020/0102147 | A1* | 4/2020 | Sullivan | G05D 1/225 |
| 2021/0183186 | A1* | 6/2021 | Patnaik | G01G 19/02 |

* cited by examiner

*Primary Examiner* — Ramsey Refai
(74) *Attorney, Agent, or Firm* — Ingrassia Fisher & Lorenz, LLP | IF&L

(57) ABSTRACT

Methods and systems for controlling movement of e-pallets using multi-modal interaction with a user are provided that include: one or more first sensors configured to obtain first sensor data of a first modality pertaining to a command from the user for movement of the e-pallets; one or more second sensors configured to obtain second sensor data of a second modality, different from the first modality, pertaining to the command; and a processor that is coupled to the one or more first sensors and the one or more second sensors, the processor configured to at least facilitate: determining an intended movement of the e-pallets based on both the first sensor data and the second sensor data; and moving the e-pallets in executing the intended movement, in accordance with instructions provided by the processor to actuators of the e-pallets.

20 Claims, 9 Drawing Sheets

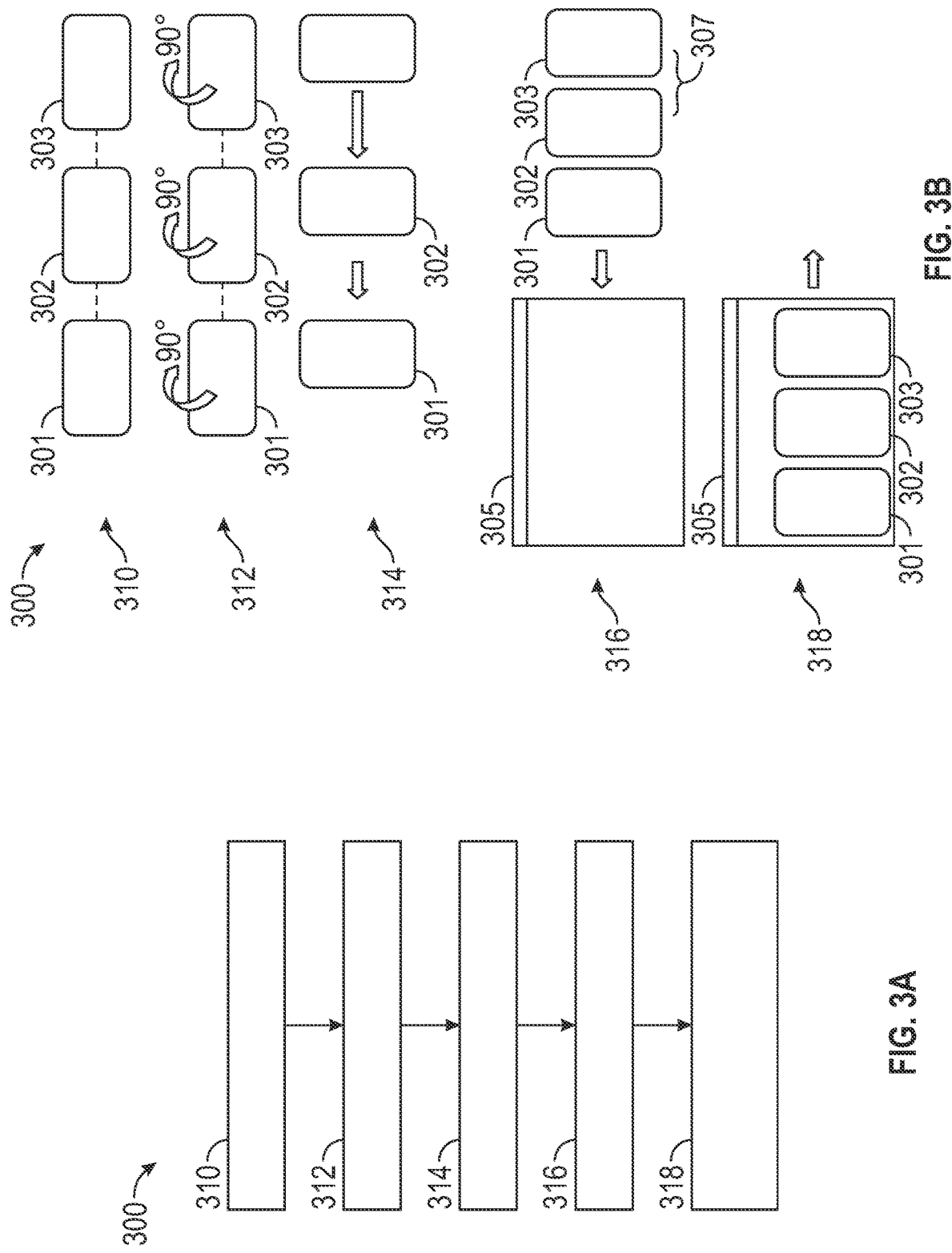

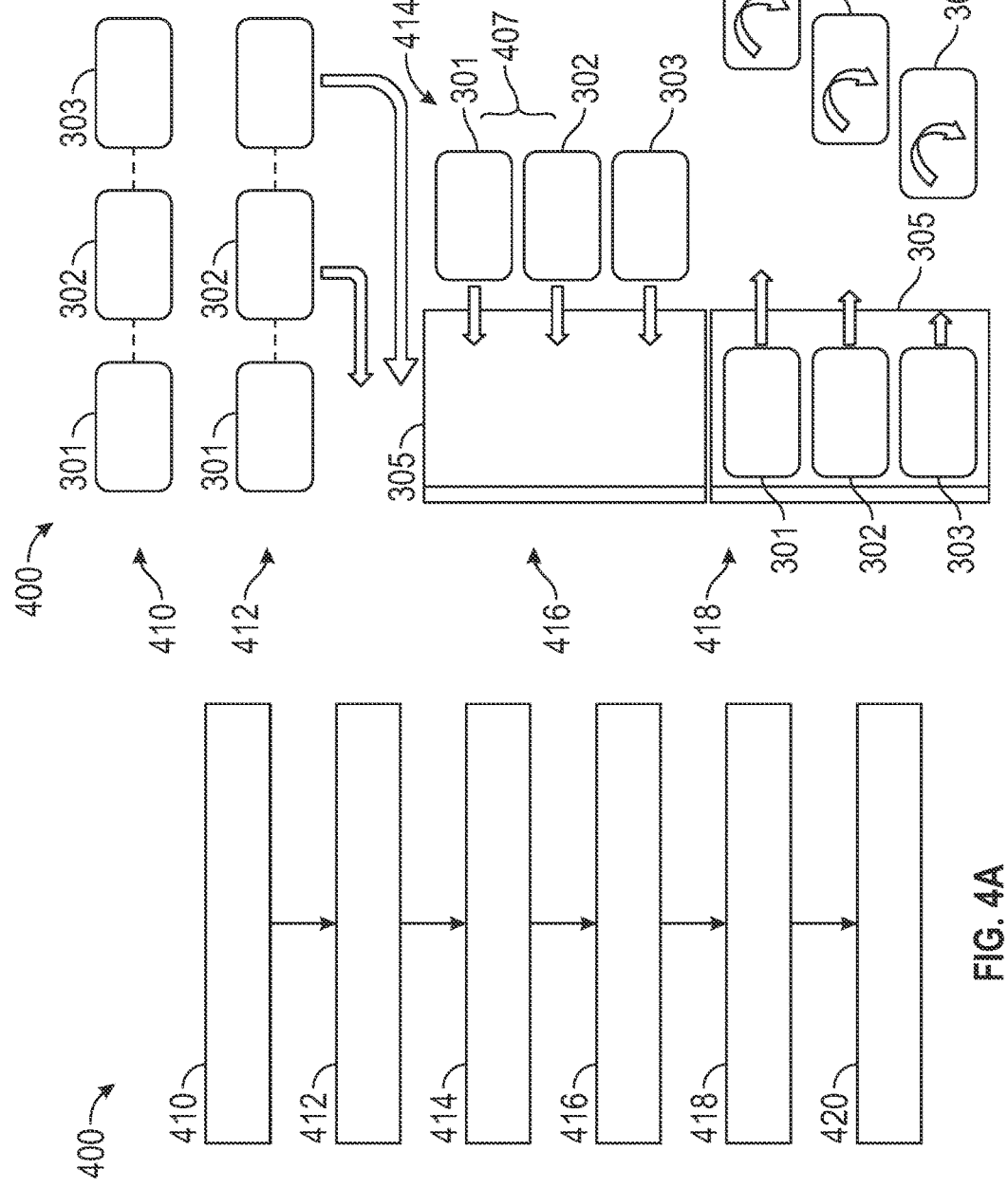

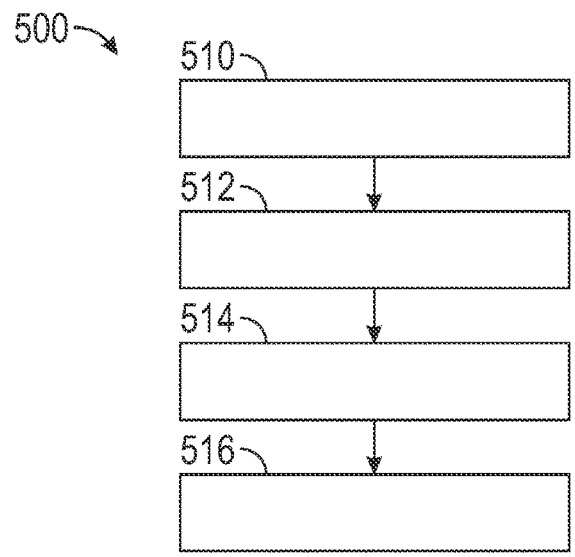
FIG. 5A
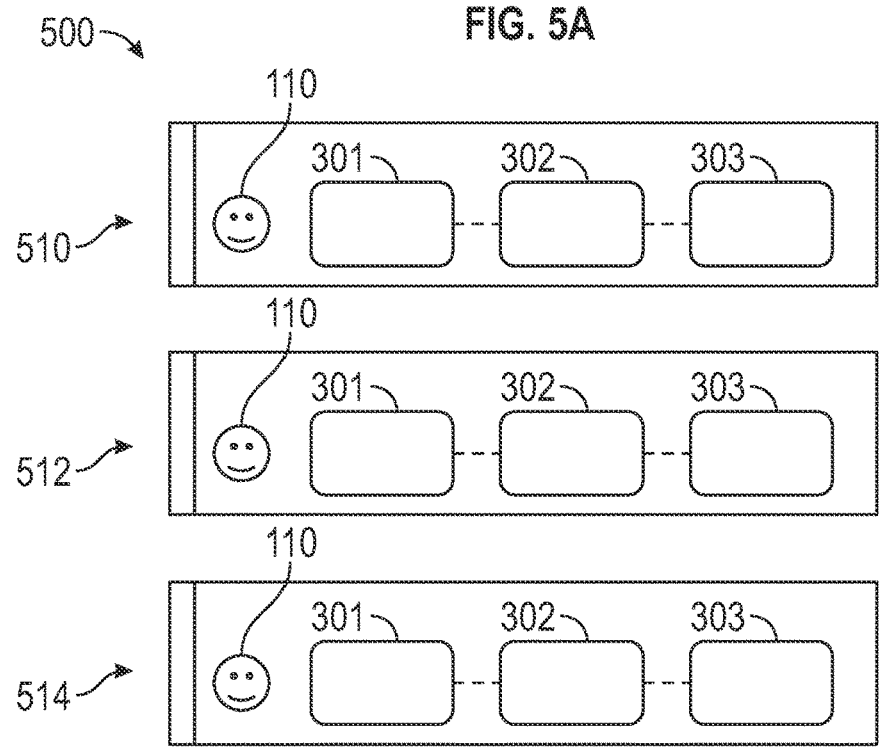
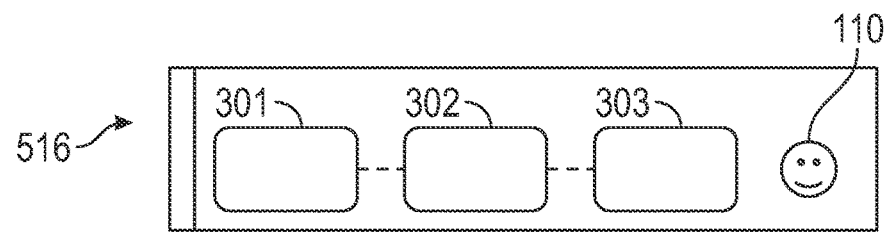
FIG. 5B

FIADAPTIVE MULTI-MODAL E-PALLET CONTROL

INTRODUCTION

The technical field generally relates to electric pallets (e-pallets), and more specifically to the control of e-pallets.

Various e-pallets today are controlled via pulling by a user/operator, such as via physical touch by a human operator. However, current techniques for control of e-pallets may not be ideal under certain circumstances.

Accordingly, it is desirable to provide systems and methods for controlling e-pallets. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling movement of one or more e-pallets using multi-modal interaction with a user of the one or more e-pallets is provided, the method including: obtaining, via one or more first sensors, first sensor data of a first modality pertaining to a command from the user for movement of the one or more e-pallets: obtaining, via one or more second sensors, second sensor data of a second modality, different from the first modality, pertaining to the command: determining, via a processor, an intended movement of the one or more e-pallets based on both the first sensor data and the second sensor data; and moving the one or more e-pallets in executing the intended movement, in accordance with instructions provided by the processor to one or more actuators of the one or more e-pallets.

Also in an exemplary embodiment: the step of obtaining the first sensor data includes obtaining vision sensor data via one or more cameras of the one or more e-pallets as to a hand gesture provided by the user; the step of obtaining the second sensor data includes obtaining audio sensor data via one or more microphones of the one or more e-pallets as to a verbal command provided by the user; and the step of determining the intended movement includes determining, via the processor, the intended movement of the one or more e-pallets based on both the vision sensor data and the audio sensor data.

Also in an exemplary embodiment, the method further includes determining, via the processor, an image quality associated with the vision sensor data: wherein the use of the vision sensor data for determining the intended movement and the moving of the one or more e-pallets is based at least in part on the image quality associated with the vision sensor data.

Also in an exemplary embodiment, the method further includes providing instructions, via the processor, for the user to face the one or more cameras, move closer toward the one or more cameras, or both, when the image quality is less than a predetermined threshold.

Also in an exemplary embodiment, the method further includes determining, via the processor, a sound quality associated with the audio sensor data: wherein the use of the audio sensor data for determining the intended movement and the moving of the one or more e-pallets is based at least in part on the sound quality associated with the audio sensor data.

Also in an exemplary embodiment, the method further includes providing instructions, via the processor, for the user to face the one or more microphones, move closer toward the one or more microphones, or both, when the sound quality is less than a predetermined threshold.

Also in an exemplary embodiment, the method further includes obtaining motion sensor data via one or more additional sensors from an electronic wearable device of the user; wherein the step of determining the intended movement includes determining, via the processor, the intended movement of the one or more e-pallets based on the vision sensor data, the audio sensor data, and the motion sensor data.

Also in an exemplary embodiment, the one or more e-pallets include a plurality of e-pallets, and the method further includes initiating, via instructions provided by the processor, one or more elevator modes of operation for the plurality of e-pallets when entering and exiting an elevator, the one or more elevator modes of operation including a switching of roles of the plurality of e-pallets between a leader role and one or more follower roles.

Also in an exemplary embodiment, the one or more e-pallets include a plurality of e-pallets, and the method further includes initiating, via instructions provided by the processor, one or more dead end modes of operation for the plurality of e-pallets when approaching a dead end in a path in which the plurality of e-pallets are travelling, the one or more dead end modes of operation including a switching of roles of the plurality of e-pallets between a leader role and one or more follower roles.

In another exemplary embodiment, a system is provided for controlling movement of one or more e-pallets using multi-modal interaction with a user of the one or more e-pallets, the system including: one or more first sensors configured to obtain first sensor data of a first modality pertaining to a command from the user for movement of the one or more e-pallets; one or more second sensors configured to obtain second sensor data of a second modality, different from the first modality, pertaining to the command; and a processor that is coupled to the one or more first sensors and the one or more second sensors, the processor configured to at least facilitate: determining an intended movement of the one or more e-pallets based on both the first sensor data and the second sensor data; and moving the one or more e-pallets in executing the intended movement, in accordance with instructions provided by the processor to one or more actuators of the one or more e-pallets.

Also in an exemplary embodiment: the one or more first sensors include one or more cameras configured to obtain vision sensor data as to a hand gesture provided by the user: the one or more second sensors include one or more microphones configured to obtain audio sensor as to a verbal command provided by the user; and the processor is configured to at least facilitate determining the intended movement of the one or more e-pallets based on both the vision sensor data and the audio sensor data.

Also in an exemplary embodiment, the processor is configured to at least facilitate determining an image quality associated with the vision sensor data; and using the vision sensor data for determining the intended movement and the moving of the one or more e-pallets based at least in part on the image quality associated with the vision sensor data.

Also in an exemplary embodiment, the processor is configured to at least facilitate providing instructions for the user to face the one or more cameras, move closer toward the one or more cameras, or both, when the image quality is less than a predetermined threshold.

Also in an exemplary embodiment, the processor is configured to at least facilitate determining a sound quality associated with the audio sensor data; and using the audio sensor data for determining the intended movement and the moving of the one or more e-pallets based at least in part on the sound quality associated with the audio sensor data.

Also in an exemplary embodiment, the processor is configured to at least facilitate providing instructions for the user to face the one or more microphones, move closer toward the one or more microphones, or both, when the sound quality is less than a predetermined threshold.

Also in an exemplary embodiment, the system further includes one or more additional sensors configured to obtain motion sensor data from an electronic wearable device of the user; wherein the processor is configured to at least facilitate determining the intended movement of the one or more e-pallets based on the vision sensor data, the audio sensor data, and the motion sensor data.

Also in an exemplary embodiment, the one or more e-pallets include a plurality of e-pallets, and the processor is configured to at least facilitate initiating, via instructions provided by the processor, one or more elevator modes of operation for the plurality of e-pallets when entering and exiting an elevator, the one or more elevator modes of operation including a switching of roles of the plurality of e-pallets between a leader role and one or more follower roles.

Also in an exemplary embodiment, the one or more e-pallets include a plurality of e-pallets, and the processor is configured to at least facilitate initiating, via instructions provided by the processor, one or more dead end modes of operation for the plurality of e-pallets when approaching a dead end in a path in which the plurality of e-pallets are travelling, the one or more dead end modes of operation including a switching of roles of the plurality of e-pallets between a leader role and one or more follower roles.

In another exemplary embodiment, an e-pallet device is provided that includes: a body; a plurality of actuators disposed on or within the body; one or more cameras disposed on or within the body and configured to obtain vision sensor data pertaining to a command from a user for movement of the body as represented via a hand gesture of the user; one or more microphones disposed on or within the body and configured to obtain audio sensor data pertaining to the command as represented via an audible utterance of the user; and a processor that is coupled to the one or more cameras, the one or more microphones, and the plurality of actuators, the processor configured to at least facilitate determining an intended movement of the e-pallet device based on both the vision sensor data and the audio sensor data; and moving the e-pallet device in executing the intended movement, in accordance with instructions provided by the processor to the plurality of actuators and that are implemented via the plurality of actuators.

Also in an exemplary embodiment, the e-pallet device further includes one or more additional sensors configured to obtain motion sensor data from an electronic wearable device of the user; and the processor is configured to at least facilitate determining the intended movement of the e-pallet device based on the vision sensor data, the audio sensor data, and the motion sensor data.

DESCRIPTION OF THE DRAWINGS

The present disclosure will hereinafter be described in conjunction with the following drawing figures, wherein like numerals denote like elements, and wherein:

FIGS. 3A and 3B are flow diagrams depicting an exemplary implementation of the process of FIG. 2 in which multiple e-pallets are controlled in accordance with a first elevator mode, in accordance with an exemplary embodiment:

FIGS. 4A and 4B are flow diagrams depicting an exemplary implementation of the process of FIG. 2 in which the e-pallets are controlled in accordance with a second elevator mode, in accordance with an exemplary embodiment:

FIGS. 5A and 5B are flow diagrams depicting an exemplary implementation of the process of FIG. 2 in which the e-pallets are controlled in accordance with a dead end mode, in accordance with an exemplary embodiment;

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
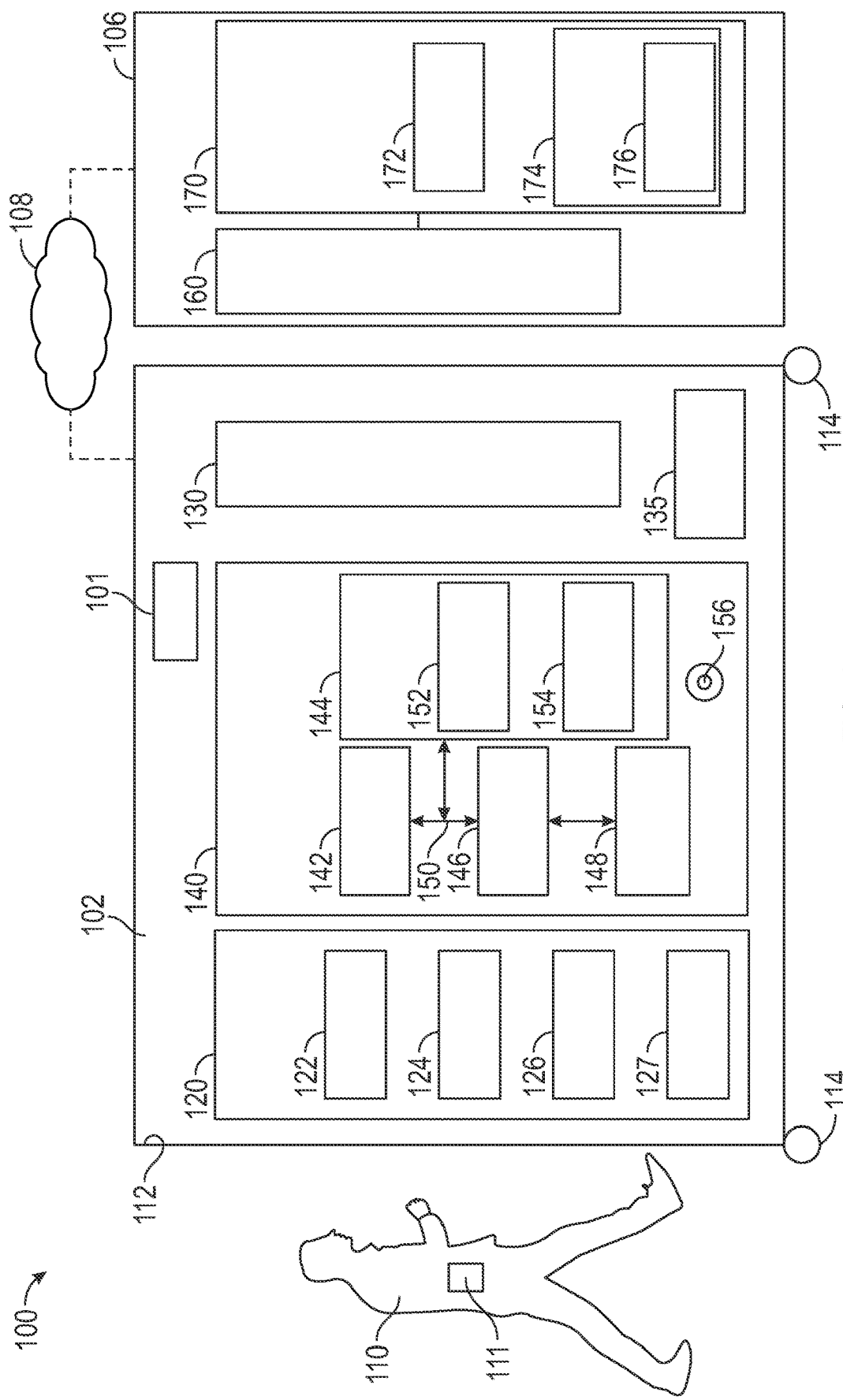
FIG. 1 is a functional block diagram of a system including an e-pallet and control for the e-pallet, in connection with an exemplary embodiment.

FIG. 1 illustrates a system 100 for control of an electric pallet (e-pallet) 102, in accordance with an exemplary embodiment. While the term electric pallet and the abbreviation e-pallet are utilized herein and throughout the application, it will be appreciated that the terms "electric pallet" and "e-pallet" (as used may comprise any number of different types of pallets, carts (e.g., shopping carts, delivery carts, and/or other carts and/or similar types of apparatus), and/or any number of other types of moving platforms. In addition, while a single e-pallet 102 is depicted in FIG. 1, it will be appreciated that in various embodiments the system 100 may include any number of e-pallets 102, for example that are controlled in concert with one another.

As depicted in FIG. 1, in certain embodiments the system 100 may also include a user 110, a remote server 106, and a communications network 108. In certain embodiments, the system 100 may also include one or more additional components.

In various embodiments, the user 110 comprises an operator that provides one or more different types of commands for the e-pallet 102, including various verbal and/or non-verbal commands. In certain embodiments, the user 110 comprises a human being. In certain embodiments, the user 110 is wearing one or more electronic wearable devices 111 (e.g., such as a smart watch, earbuds, vest, or the like) that is configured to transmit signals pertaining to movement of the user 110. In certain other embodiments, the user 110 may comprise a robot and/or other electronic device.

Also in various embodiments, the e-pallet 102 implements the commands provided by the user 110 in accordance with control of the e-pallet 102 that is conducted and/or facilitated by one or more computer systems (including one or more processors) that reside in the e-pallet 102, the remote server 106, or both. As depicted in FIG. 1, in various embodiments, the e-pallet communicates with the remote server 106 via one or more communications networks 108 (e.g., one or more wireless communications networks, such as via one or more cellular-based communications networks, one or more satellite-based communications networks, and/or one or more other types of wireless communications networks).

As depicted in FIG. 1, in various embodiments the e-pallet includes a body 112, a differential drive 101, one or more wheels 114, a sensor array 120, a transceiver 130, one or more actuators 135, and a computer system 140.

In the depicted embodiment, the body 112 substantially encloses other components of the e-pallet 102. In various embodiments, the differential drive 101 includes at least two motors that control movement of the e-pallet 102 based on a polarity of voltage applied thereto. In addition, in certain embodiments, the wheels 114 are each rotationally coupled to one or more of the axles (not depicted) near a respective corner of the body 112 to facilitate movement of the e-pallet 102. However, this may vary in different embodiments. Similar, the number and placement of the wheels 114 may also vary in different embodiments.

Figure 2:
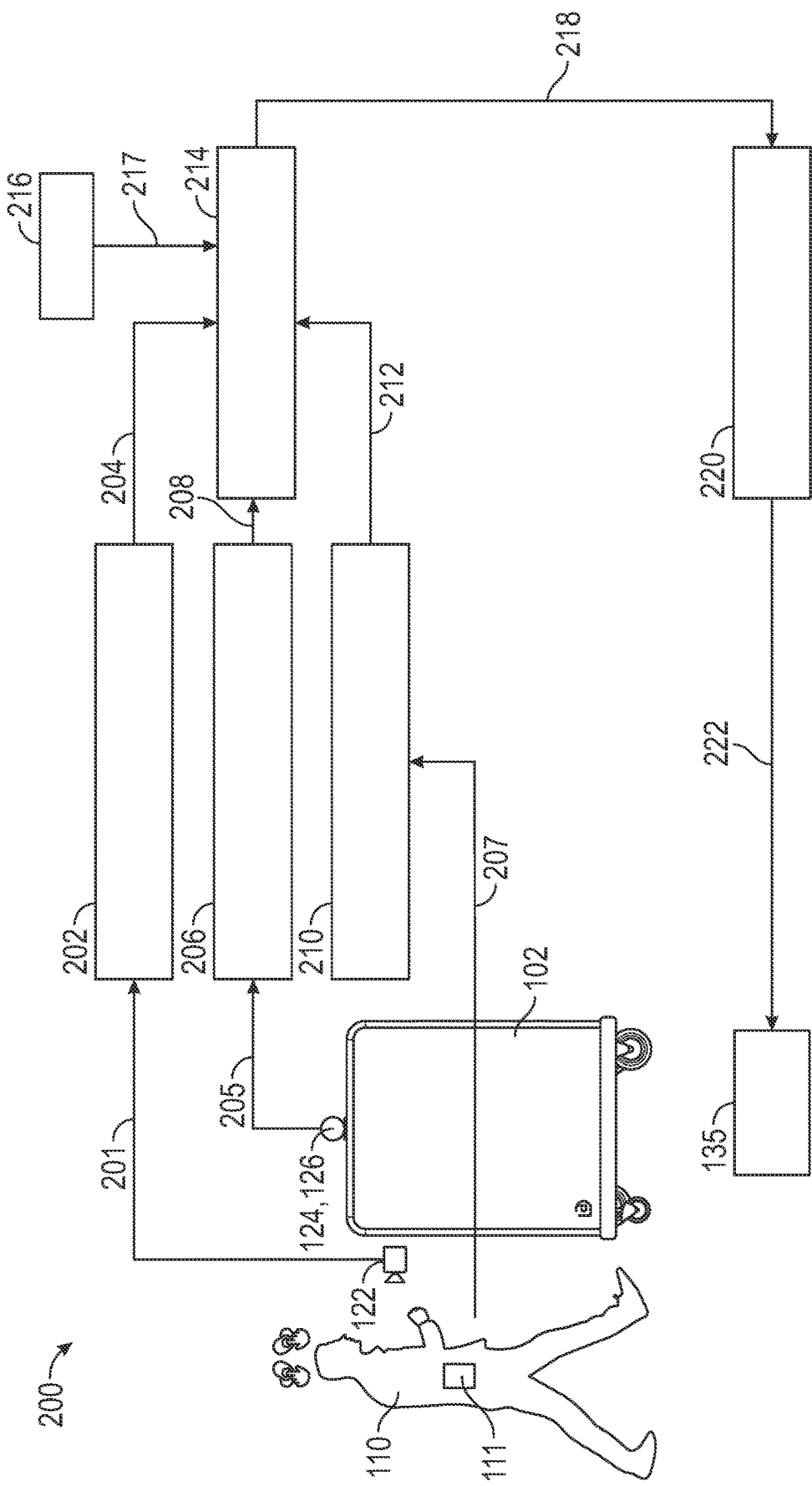
FIG. 2 is a flowchart of a process for controlling one or more e-pallets, and that can be incorporated in connection with the system of FIG. 1, in accordance with an exemplary embodiment.

In various embodiments, the sensor array 120 includes a plurality of sensors that are used for communicating with the user 110. As depicted in FIG. 2, in various embodiments the sensor array 120 includes one or more cameras 122, microphones 124, speakers 126, and other sensors 127. In certain embodiments, the cameras 122 obtain sensor data as to inputs pertaining to visual commands (e.g., gestures) from the user 110 pertaining to operation of the e-pallet 102. Also in certain embodiments, the microphones 124 obtain sensor data as to inputs pertaining to audible commands (e.g., voice commands) from the user 110 pertaining to operation of the e-pallet 102. In addition, in certain embodiments, the speakers 126 are used to provide feedback from the e-pallet 102 to the user 110, for example as to suggestions or requests for the user 110 to take one or more actions (e.g., such as moving closer to and/or facing the cameras 122 and/or microphones 124) to improve the accuracy of the inputs as received by the e-pallet 102. Also in various embodiments, the sensor array 120 also includes one or more other sensors 127 (e.g., one or more ultra-wide band and/or other radio-based sensors) configured to obtain motion data via the electronic wearable device 111 of the user 110.

In various embodiments, the transceiver 130 is utilized to communicate with the remote server 106, for example as to the inputs received from the user 110 and/or the implementation of commands pertaining thereto. In addition, in certain embodiments, the transceiver 130 is also utilized to communicate with other e-pallets, for example as to a coordinated implementation of commands from the user 110.

Also in various embodiments, the actuators 135 are used to move the e-pallet 102 in connection with the implementation of the commands from the user 110. In certain embodiments, the actuators 135 are directly or indirectly coupled to the wheels 114 (and/or one or more axles that are coupled thereto), and are configured to cause or facilitate the movement and/or rotation of the wheels 114 in accordance with instructions that are provided by the computer system 140 of the e-pallet 102 and/or by the remove server 106 in connection with implementing the commands provided by the user 110.

In various embodiments, the computer system 140 is coupled to the sensor array 120, the transceiver 130, and the actuators 135. As depicted in FIG. 1, in various embodiments the computer system 140 comprises a computer controller that includes a processor 142, a memory 144, an interface 146, a storage device 148, a bus 150, and a secondary memory storage device (e.g., disk) 156. In certain embodiments, the computer system 140 may also include the sensor array 120, one or more of the other systems or components thereof, and/or one or more other platform components. In addition, it will be appreciated that the computer system 140 may otherwise differ from the embodiment depicted in FIG. 1. For example, the computer system 140 may be coupled to or may otherwise utilize one or more remote computer systems and/or other control systems, for example as part of one or more of the above-identified platform devices and systems.

In various embodiments, the processor 142 performs the computation and control functions of the computer system 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the computer system 140 and the computer system of the computer system 140, generally in executing the processes described herein, such as the processes discussed further below in connection with FIGS. 2-9.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154 (e.g., including, in various embodiments, predetermined threshold values for controlling the e-pallet 102).

The bus 150 serves to transmit programs, data, status and other information or signals between the various components of the computer system of the computer system 140. The interface 146 allows communications to the computer system of the computer system 140, for example from a system driver and/or another computer system, and can be implemented using any suitable method and apparatus. In one embodiment, the interface 146 obtains the various data from the sensor array 120 and/or one or more other components and/or systems of the e-pallet 102. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the processes discussed further below in connection with FIGS. 2-9. In another exemplary embodiment, the program product may be directly stored in and/or otherwise accessed by the memory 144 and/or one or more other disks 156 and/or other memory devices.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the computer system 140 may also otherwise differ from the embodiment depicted in FIG. 1, for example in that the computer system of the computer system 140 may be coupled to or may otherwise utilize one or more remote computer systems and/or other control systems.

With continued reference to FIG. 1, in various embodiments the remote server 106 includes a transceiver 160 along with a computer system 170 that includes a processor 172 and a computer memory 174 with stored values 176. In various embodiments, these components of the remote server 106 are similar in structure and function to those corresponding components of the e-pallet 102 as described above.

FIG. 2 is a flowchart of a process 200 for controlling an e-pallet, in accordance with an exemplary embodiment. In various embodiments, the process 200 incorporates sensor data of different modalities, and further incorporates surrounding conditions such as lightning, noise, and the like for controlling the e-pallet 102. In addition, in various embodiments, the process 200 may be implemented in connection with the system 100 of FIG. 1, including the user 110 and one or more e-pallets 102 of FIG. 1. In certain embodiments, the process 200 may also be implemented in connection with the remote server 106 of FIG. 1. Also, while a single e-pallet 102 is depicted in FIG. 2, it will be appreciated that the process 200 may also be utilized for controlling a plurality of e-pallets in accordance with exemplary embodiments.

As depicted in FIG. 2, in various embodiments, the user 110 provides instructions and commands for movement of the e-pallet 102 using a plurality of modalities, including: hand gestures as well as verbal commands, in addition to commands provided via the electronic wearable device 111. The control of the e-pallet 102 using each of these techniques is described below.

In various embodiments, vision data 201 from the user 110 is captured via one or more cameras 122 of the e-pallet 102. In various embodiments, the vision data 201 includes camera images as to hand gestures of the user 110.

In various embodiments, gesture recognition is performed on the vision data 201 (step 202). In various embodiments, markerless vision-based gesture recognition is performed by the processor 142 of the e-pallet 102 of FIG. 1, and/or in certain embodiments by the processor 172 of the remote server 106 of FIG. 1. In various embodiments, the gesture recognition yields vision gesture recognition output 204 for further processing.

As depicted in FIG. 1, information as to known gesture meanings is obtained (step 216). In various embodiments, the information of step 216 includes data as to known meanings of various different hand gestures, such as from the current user 110 and/or from other operators of similar e-pallets. In various embodiments, this data is obtained from a computer memory, such as from the computer memory 144 as stored values 154 therefrom on the e-pallet 102 of FIG. 1, and/or from the computer memory 174 as stored values 176 therefrom on the remote server 106 of FIG. 1. In various embodiments, step 216 yields known gesture output 217 for further analysis.

In certain embodiments, the known meanings of the various different hand gestures (e.g., that is stored in the computer memory) include the following: (i) moving forward-push away: the user walks towards the e-pallet with the index finger pointing towards the e-pallet; (ii) moving backward/approach the user more: the user walks away from the e-pallet (e.g., either the user walks backwards facing the e-pallet with the index finger pointing towards the e-pallet, or the user's back faces the camera); (iii) turning left/push away left: the user walks towards the e-pallet with the index finger pointing left towards the e-pallet: (iv) turning right/push away right: the user walks towards the e-pallet with the index finger pointing right towards the e-pallet; (v) stop motion/park: the user stops walking and/or stops pointing the index finger: (vi) move beside to the right: the user wants to load/unload e-pallet and move to his or her right side by pointing the index finger up; (vii) move beside to the left: the user wants to load/unload e-pallet and move to your left side by pointing the index finger down; (viii) open closure: the user points a clockwise circle; (ix) close closure: the user points a counter-clockwise circle; (x) predefined modes: for example, elevator mode first and second versions, dead-end mode, and so on.

In various embodiments, the vision gesture recognition output 204 is compared with the known gesture output 217 during step 214 along with other data from the microphone 124 of the e-pallet 102 and the electronic wearable device 111 of the user 110, as described in greater detail further below.

As depicted in FIG. 2, in various embodiments audio data 205 from the user 110 is captured via one or more microphones 124 of the e-pallet 102. In various embodiments, the audio data 205 includes captured microphone recordings as to the verbal utterances or commands of the user 110.

In various embodiments, intent recognition is performed on the audio data 205 (step 206). In various embodiments, speech-based intent recognition is performed by the processor 142 of the e-pallet 102 of FIG. 1, and/or in certain embodiments by the processor 172 of the remote server 106 of FIG. 1. In various embodiments, the speech-based intent recognition yields audio intent recognition output 208 for further processing.

In addition, also as depicted in FIG. 2, in various embodiments motion data 207 from the user 110 is captured. In various embodiments, the motion data 207 includes captured motion data from one or more other sensors 127 of the sensor array 120 from one or more electronic wearable devices 111 of the user 110.

In various embodiments, motion-based recognition is performed on the motion data 207 (step 210). In various embodiments, wearable device motion-based gesture recognition is performed by the processor 142 of the e-pallet 102 of FIG. 1, and/or in certain embodiments by the processor 172 of the remote server 106 of FIG. 1. In various embodiments, the motion-based gesture recognition yields motion gesture recognition output 212 for further processing.

In various embodiments, the vision gesture recognition output 204, the known gesture output 217, the audio intent recognition output 208, and the motion gesture recognition output 212 are each compared with one another (step 214). In various embodiments, the vision gesture recognition output 204, the known gesture output 217, the audio intent recognition output 208, and the motion gesture recognition output 212 are each fused together for analysis by a processor (such as the processor 142 and/or processor 172 of FIG. 1) in order to determine a predicted command 218 (based on all of the aggregate data and the processing thereof) from the user 110 for movement of the e-pallet 102.

In various embodiments, the predicted command is provided to an e-pallet control module including a processor (such as the processor 142 and/or processor 172 of FIG. 1) for implementation (step 220). In various embodiments, the predicted command 218 is implemented in accordance with implementation instructions 222 that are provided by the processor and that are implemented by the e-pallet actuators 135 of FIG. 1 for movement of the e-pallet 102 in a manner corresponding to the predicted command 218 of the user 110. In various embodiments, the process 200 then either terminates or repeats with updated sensor data.

In various embodiments, in accordance with the process 200 of FIG. 2 and the various embodiments of FIGS. 3A-9, the control of the e-pallets 102 combines motion primitives to generate both relatively simple motions (e.g., push away from me, approach me, push and pull to the right, push and pull to the left, park, open/close closure) as well as complex motion behaviors (e.g., elevator modes, dead-end mode, and related modes such as ramp mode, building ingress mode, building egress mode, and so on). In addition, also in various embodiments, the control of the e-pallets 102 further includes an adaption of the interaction of e-pallets 102 taking into consideration the surrounding conditions (such lighting, noise, line of sight, and so on).

FIGS. 3A and 3B are flow diagrams depicting an exemplary implementation of the process of FIG. 2 in accordance with an exemplary embodiment in which a plurality of e-pallets are controlled in accordance with a first elevator mode in accordance with a process 300, in accordance with an exemplary embodiment. FIGS. 3A and 3B depict the process 300 with three e-pallets, namely: a first e-pallet 301, a second e-pallet 302, and a third e-pallet 303. In various embodiments, each of the first e-pallet 301, second e-pallet 302, and third e-pallet 303 comprises an e-pallet 102 with the components, characteristics, and features described above in connection with FIG. 1. In addition, it will be appreciated that the process 300 may also be implemented with a different number of e-pallets in various embodiments.

As depicted in FIG. 3A, in various embodiments, the process 300 includes an alignment of the e-pallets (step 310). With reference to FIG. 3B, in various embodiments, during step 310 the e-pallets are aligned with the first e-pallet 301 positioned as leader, the second e-pallet 302 positioned as first follower (i.e., that directly follows the leader), and the third e-pallet 303 positioned as a second follower (i.e., that directly follows the first follower). Also in various embodiments, the alignment is attained via instructions provided by one or more processors, such as one or more processors 142 of the first e-pallet 301, second e-pallet 302, and/or third e-pallet 303, and/or the processor 172 of the remote server 106 of FIG. 1. In an exemplary embodiment, each of the first e-pallet 301, second e-pallet 302, and third e-pallet 303 are parked in this sequence in front of an elevator, such as the elevator 305 depicted further below in FIG. 3.

Also in various embodiments, the process 300 includes steering of the e-pallets (step 312). With reference to FIG. 3B, in various embodiments, during step 312 the first e-pallet 301, second e-pallet 302, and third e-pallet 303 are each rotated ninety degrees. In various embodiments, each of the first e-pallet 301, second e-pallet 302, and third e-pallet 303 are rotated ninety degrees in a clockwise manner away from the elevator 305. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

Also in various embodiments, the process 300 includes cohesion of the e-pallets (step 314). With reference to FIG. 3B, in various embodiments, during step 314 gaps are closed between the first e-pallet 301, second e-pallet 302, and third e-pallet 303, generating a calibratable cohesion gap 307 therebetween, and thereby enhancing cohesion between these different e-pallets. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

In addition, in various embodiments, the process 300 includes ingress of the e-pallets (step 316). With reference to FIG. 3B, in various embodiments, the first e-pallet 301, second e-pallet 302, and third e-pallet 303 move forward in this order into the elevator 305. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

Also in various embodiments, the process 300 includes egress of the e-pallets (step 318). With reference to FIG. 3B, in various embodiments, the first e-pallet 301 and third e-pallet 303 swatch leadership roles, such that: the third e-pallet 303 is now the leader and the third e-pallet 303 is now the second follower (while the second e-pallet 302 remains the first follower). Also in various embodiments, the first e-pallet 301, second e-pallet 302, and third e-pallet 303 move together in this order out of the elevator 305. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1. In various embodiments, the process 300 then terminates.

FIGS. 4A and 4B are flow diagrams depicting an exemplary implementation of the process of FIG. 2 in accordance with another exemplary embodiment in which a plurality of e-pallets are controlled in accordance with a second elevator mode in accordance with a process 400, in accordance with an exemplary embodiment. FIGS. 4A and 4B depict the process 400 with three e-pallets, such as the first e-pallet 301, second e-pallet 302, and third e-pallet 303 described above in connection with FIGS. 3A and 3B. In addition, it will be appreciated that the process 400 may also be implemented with a different number of e-pallets in various embodiments.

As depicted in FIG. 4A, in various embodiments, the process 400 includes an alignment of the e-pallets (step 410). With reference to FIG. 4B, in various embodiments, during step 410 the e-pallets are aligned with the first e-pallet 301 positioned as leader, the second e-pallet 302 positioned as the first follower, and the third e-pallet 303 positioned as the second follower (e.g., similar that of step 310 described above in connection with FIGS. 3A and 3B). Also in various embodiments, the alignment is attained via instructions provided by one or more processors, such as one or more processors 142 of the first e-pallet 301, second e-pallet 302, and/or third e-pallet 303, and/or the processor 172 of the remote server 106 of FIG. 1.

Also in various embodiments, the process 400 includes steering of the e-pallets (step 412). With reference to FIG. 4B, in various embodiments, during step 412 the first e-pallet 301, second e-pallet 302, and third e-pallet 303 are each repositioned in parallel. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

Also in various embodiments, the process 400 includes cohesion of the e-pallets (step 414). With reference to FIG. 4B, in various embodiments, during step 314 gaps are closed between the first e-pallet 301, second e-pallet 302, and third e-pallet 303, generating a calibratable cohesion gap 407 therebetween, and thereby enhancing cohesion between these different e-pallets. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

In addition, in various embodiments, the process 400 includes ingress of the e-pallets (step 416). With reference to FIG. 4B, in various embodiments, the first e-pallet 301, second e-pallet 302, and third e-pallet 303 move forward in this order into the elevator 305 in a manner such that the first e-pallet 301, second e-pallet 302, and third e-pallet 303 simultaneously enter the elevator 305 parallel to one another. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

Also in various embodiments, the process 400 includes egress of the e-pallets (step 418). With reference to FIG. 4B, in various embodiments, the first e-pallet 301, second e-pallet 302, and third e-pallet 303 move together out of the elevator 305, simultaneously and parallel to one another. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

In addition, in various embodiments, the platoon recovers (step 420). With reference to FIG. 4B, in various embodiments, the first e-pallet 301, second e-pallet 302, and third e-pallet 303 each rotate one hundred eighty degrees clockwise, thereby effectively flipping horizontally, to recover the platoon. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1. In various embodiments, the process 400 then terminates.

FIGS. 5A and 5B are flow diagrams depicting an exemplary implementation of the process of FIG. 2 in accordance with another exemplary embodiment in which a plurality of e-pallets are controlled in accordance with a dead end mode in accordance with a process 500, in accordance with an exemplary embodiment. FIGS. 5A and 5B depict the process 500 with the user 110 of FIG. 1 along with three e-pallets, such as the first e-pallet 301, second e-pallet 302, and third e-pallet 303 described above in connection with FIGS. 3A and 3B. In addition, it will be appreciated that the process 500 may also be implemented with a different number of e-pallets in various embodiments.

As depicted in FIG. 5A, in various embodiments, the process 500 includes dead end detection (step 510). In various embodiments, the dead end (e.g., an end of a hallway or passageway) is detected via one or more sensors of one or more of the e-pallets, such as via one or more cameras 122 of the first pallet 301. With reference to FIG. 5B, in various embodiments, during step 510 the e-pallets are aligned with the first e-pallet 301 positioned as leader (and in closest proximity to the user 110), the second e-pallet 302 positioned as the first follower, and the third e-pallet 303 positioned as a second follower. Also in various embodiments, the first pallet 301, second pallet 302, and third pallet 303 are pulled toward the dead end, in accordance with instructions provided by one or more processors, such as one or more processors 142 of the first e-pallet 301, second e-pallet 302, and/or third e-pallet 303, and/or the processor 172 of the remote server 106 of FIG. 1.

Also in various embodiments, the process 500 includes a switching of roles (step 512). With reference to FIG. 5B, in various embodiments, during step 512 the first e-pallet 301 and third e-pallet 303 switch roles, such that the third e-pallet 303 becomes the leader and the first e-pallet 301 becomes the second follower (while the second e-pallet 302 remains the first follower). Also in various first e-pallet 301, second e-pallet 302, and third e-pallet 303 are each repositioned in parallel. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

In various embodiments, the process 500 includes a reversing of motion direction (step 514). With reference to FIG. 5B, in various embodiments, during step 514 moving direction for each of the first e-pallet 301, second e-pallet 302, and third e-pallet 303 is changed by changing the polarity of the differential drives 101 of each of the respective e-pallets. Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1.

In various embodiments, the e-pallets are pulled away from the dead end (step 516). With reference to FIG. 5B, in various embodiments, during step 516 the first e-pallet 301, the second e-pallet 302, and the third e-pallet 303 are then pulled away from the dead end in this sequence (i.e., with the first e-pallet 301 being first as the leader, the second e-pallet 302 being next as the first follower, and the third e-pallet 303 being next as the second follower). Also in various embodiments, this is performed via instructions provided by one or more processors, such as one or more processors 142 of the first e-pallet 301, second e-pallet 302, and/or third e-pallet 303, and/or the processor 172 of the remote server 106 of FIG. 1. In various embodiments, the process 500 then terminates.

Figure 6:
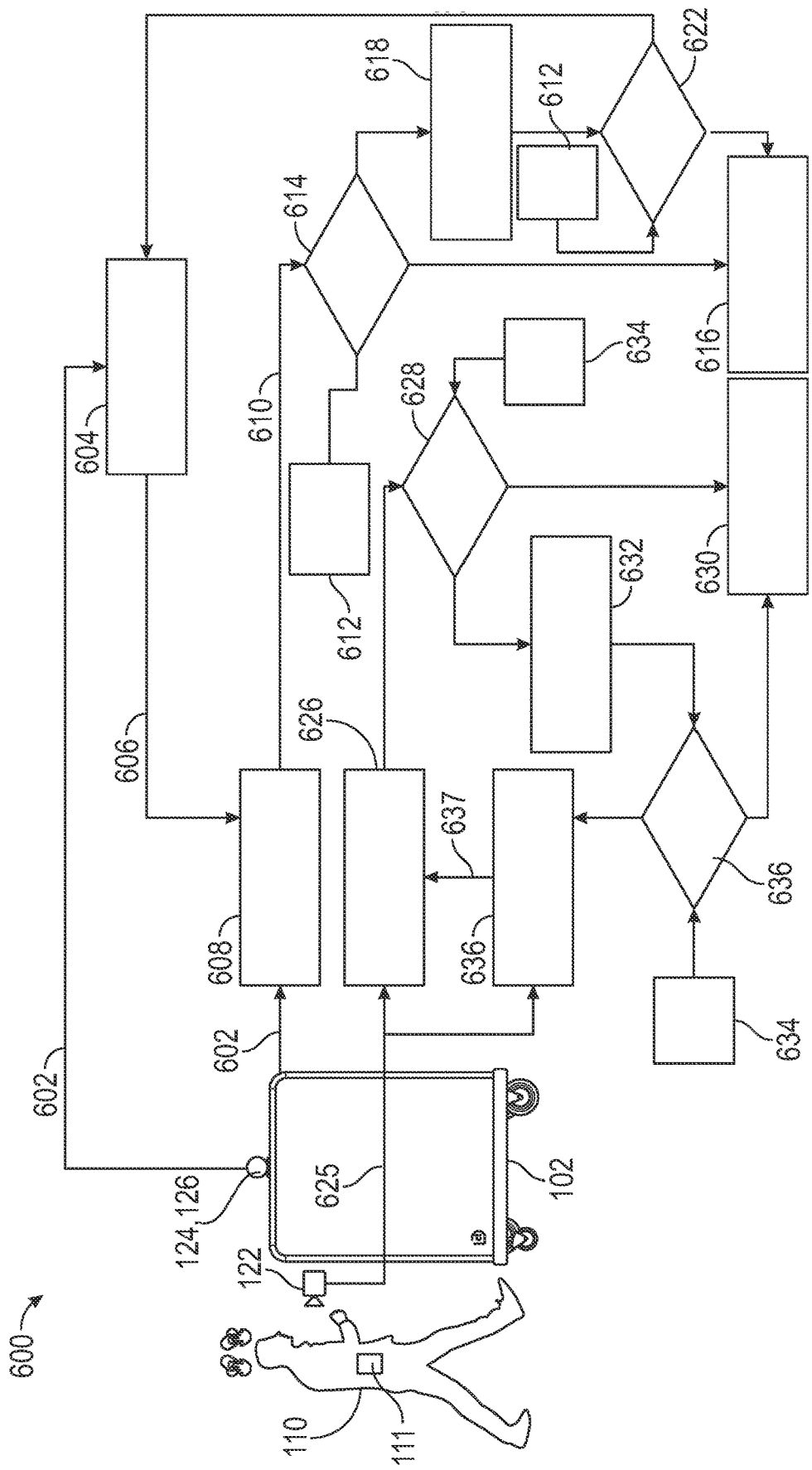
FIG. 6 is a flow diagram depicting an exemplary implementation of the process of FIG. 2 in which the e-pallet is controlled using inputs that are received via multi-modal interaction from a user, in accordance with an exemplary embodiment.

FIG. 6 is a flow diagram depicting a process 600 that provides an exemplary implementation of the process 200 of FIG. 2 in which an e-pallet is controlled using inputs that are received via multi-modal interaction from a user, in accordance with an exemplary embodiment. In various embodiments, the process 600 can similarly be implemented in connection with the system 100 of FIG. 1, including the user 110 and one or more e-pallets 102 of FIG. 1. In certain embodiments, the process 600 may also be implemented in connection with the remote server 106 of FIG. 1. Also, while a single e-pallet 102 is depicted in FIG. 6, it will be appreciated that the process 600 may also be utilized for controlling a plurality of e-pallets in accordance with exemplary embodiments.

As depicted in FIG. 6, in various embodiments, the user 110 provides instructions and commands for movement of the e-pallet 102 using hand gestures as well as verbal commands. The control of the e-pallet 102 using both gestures and verbal commands is described below.

As depicted in FIG. 6, in various embodiments audio data 602 from the user 110 is captured via one or more microphones 124 of the e-pallet 102. In various embodiments, the audio data 602 includes captured microphone recordings as to the verbal utterances or commands of the user 110.

In various embodiments, speech enhancement is performed on the audio data 602 (step 604). In various embodiments, the speech enhancement is performed by the processor 142 of the e-pallet 102 of FIG. 1, and/or in certain embodiments by the processor 172 of the remote server 106 of FIG. 1. In various embodiments, the speech enhancement yields an enhanced signal 606 for further processing.

In various embodiments, acoustic signal characterization is also performed (step 608). In various embodiments, the acoustic signal characterization is performed on the audio data 602, utilizing the enhanced signal 606. In various embodiments, the acoustic signal characterization is performed by the processor 142 and/or processor 172 of FIG. 1, and yields a sound characteristic (S.C.) 610 for the acoustic signal. In certain embodiments, the sound characteristics 610 comprise a sound pressure level (SPL). In other embodiments, the sound characteristic 610 comprises a signal to noise ratio (SNR). In other embodiments, one or more other types of sound characteristics 610 may be utilized.

In various embodiments, a determination is made as to whether the acoustic signal is noisy (step 614). In various embodiments, this determination is made by one or more processors (such as the processor 142 and/or processor 172 of FIG. 1) as to whether the sound characteristic 610 (e.g., SNR or SPL, in certain embodiments) is greater than a predetermined threshold level 612 that is stored in the memory 144 and/or 174 of FIG. 1.

In various embodiments, if it is determined that the acoustic signal is not noisy (e.g., that the sound characteristic 610 is less than or equal to the predetermined threshold level 612), then voice control is enabled for the e-pallet (step 616). In various embodiments, this is implemented in accordance with instructions provided by one or more processors (such as the processor 142 and/or processor 172 of FIG. 1)

Conversely, in various embodiments, if it is instead determined that the acoustic signal is noisy (e.g., that the sound characteristic 610 is greater than the predetermined threshold level 612), then speech guidance is activated (step 618). Specifically, in certain embodiments, instructions are provided from the e-pallet 102 to the user 110 for the user to take one or more actions to improve the audio signal from the user 110. For example, in certain embodiments, the user 110 may be requested to turn toward the microphone 124 and/or to move closer to the microphone 124, and so on. In certain embodiments, these instructions may be provided by the speaker 126 in accordance with instructions provided by one or more processors (such as the processor 142 and/or processor 172 of FIG. 1).

In various embodiments, a subsequent determination is made as to whether the acoustic signal is still noisy (step 622). In various embodiments, step 622 is performed similar to step 614, but with updated data following the speech guidance of step 618.

In various embodiments, if it is determined in step 622 that the acoustic signal is no longer noisy (e.g., that the sound characteristic 610 is now less than or equal to the predetermined threshold level 612), then the process proceeds to the above-described step 616, as voice control is enabled for the e-pallet.

Conversely, in various embodiments, if it is instead determined in step 622 that the acoustic signal is still noisy (e.g., that the sound characteristic 610 is still greater than the predetermined threshold level 612), then the process proceeds instead to the above-described step 604, as further speech enhancement is performed (and the process continues in a new iteration).

In addition, as depicted in FIG. 6, in various embodiments vision data 625 from the user 110 is captured via one or more cameras 122 of the e-pallet 102. In various embodiments, the vision data 625 includes captured camera images as to the hand gestures of the user 110.

In various embodiments, image enhancement is performed on the vision data 625 (step 636). In various embodiments, the image enhancement is performed by the processor 142 of the e-pallet 102 of FIG. 1, and/or in certain embodiments by the processor 172 of the remote server 106 of FIG. 1. In various embodiments, the image enhancement yields an enhanced image 637 for further processing.

In various embodiments, an image quality estimate (IQE) is generated for the vision data step (626). In certain embodiments, the IQE comprises an image quality index (IQI) for the vision data: however, this may vary in other embodiments. In various embodiments, the image quality estimate (the IQE, and in certain embodiments the IQI) is generated for the vision data 625, utilizing the enhanced image 637, by one or more processors (such as the processor 142 and/or processor 172 of FIG. 1).

In various embodiments, a determination is made as to whether the IQE (e.g., IQI in certain embodiments) of step 626 is greater than a predetermined threshold value (step 628). In various embodiments, this determination is made by one or more processors (such as the processor 142 and/or processor 172 of FIG. 1) as to whether the IQE (e.g., IQI) is greater than a predetermined threshold level 634 that is stored in the memory 144 and/or 174 of FIG. 1.

In various embodiments, if it is determined in step 628 that the IQE (e.g., IQI) is greater than the predetermined threshold level, then gesture control is enabled for the e-pallet (step 630). In various embodiments, this is implemented in accordance with instructions provided by one or more processors (such as the processor 142 and/or processor 172 of FIG. 1).

Conversely, in various embodiments, if it is instead determined that the IQE (e.g., IQI) is less than or equal to the predetermined threshold value, then vision guidance is activated (step 632). Specifically, in certain embodiments, instructions are provided from the e-pallet 102 to the user 110 for the user to take one or more actions to improve the vision signal. For example, in certain embodiments, the user 110 may be requested to turn toward the camera 122 and/or to move closer to the camera 122, and so on. In certain embodiments, these requests for the user 100 may be provided by the speaker 126 in accordance with instructions provided by one or more processors (such as the processor 142 and/or processor 172 of FIG. 1).

In various embodiments, a subsequent determination is made as to whether the IQE (e.g., IQI) is still less than or equal to the predetermined threshold (step 636). In various embodiments, step 636 is performed similar to step 628, but with updated data following the speech guidance of step 618.

In various embodiments, if it is determined in step 636 that the IQE (e.g., IQI) is now greater than the predetermined threshold value, then the process proceeds to the above-described step 630, as gesture control is enabled for the e-pallet.

Conversely, in various embodiments, if it is instead determined in step 636 that the IQI is still less than or equal to the predetermined threshold value, then the process proceeds instead to the above-described step 636, as further image enhancement is performed (and the process continues in a new iteration).

Figure 7:
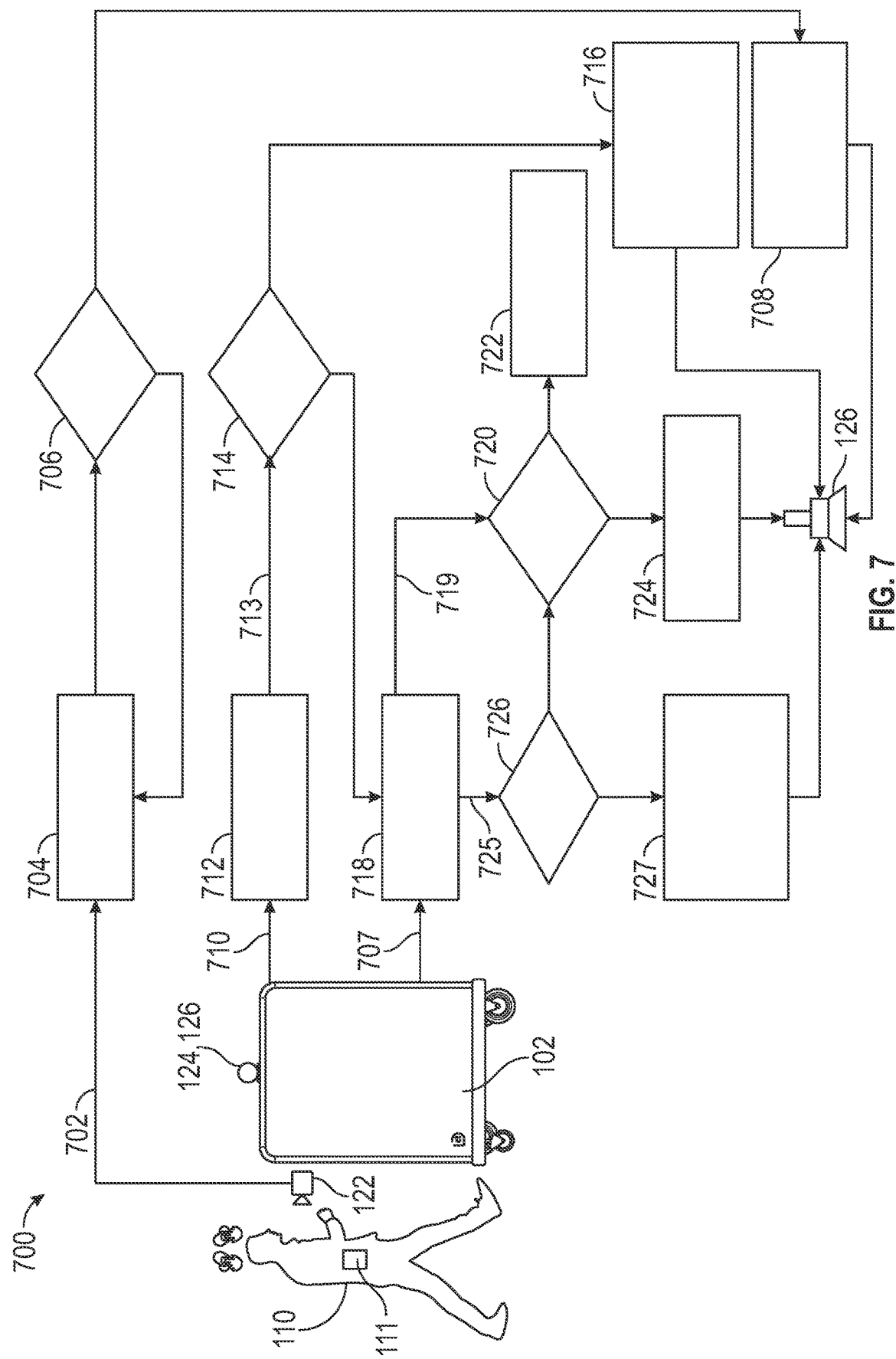
FIG. 7 is a flow diagram depicting an exemplary implementation of the process of FIG. 2 in which the e-pallet is controlled in accordance with vision and speech inputs from a user, in accordance with an exemplary embodiment.

FIG. 7 is a flow diagram depicting another exemplary implementation of the process 200 of FIG. 2 in which the e-pallet is controlled in accordance with vision and speech inputs from a user, in accordance with an exemplary embodiment. In various embodiments, the process 700 can similarly be implemented in connection with the system 100 of FIG. 1.

As depicted in FIG. 7, in various embodiments vision data 702 from the user 110 is captured via one or more cameras 124 of the e-pallet 102. In various embodiments, the vision data 702 includes captured camera images as to the hand gestures of the user 110.

In various embodiments, an image quality estimate (IQE) is generated for the vision data (step 704). In certain embodiments, the IQE comprises an image quality index (IQI) for the vision data: however, this may vary in other embodiments. In various embodiments, the image quality index is generated for the vision data 702 utilized an enhanced image by one or more processors (such as the processor 142 and/or processor 172 of FIG. 1), similar to steps 636 and 637 described above in connection with FIG. 6.

In various embodiments, a determination is made as to whether the image quality is satisfactory (step 706). Specifically, in various embodiments, a determination is made as to whether the IQE (e.g., IQI) of step 704 is greater than a predetermined threshold value. In various embodiments, this determination is made by one or more processors (such as the processor 142 and/or processor 172 of FIG. 1) as to whether the IQE (e.g., IQI) is greater than a predetermined threshold level that is stored in the memory 144 and/or 174 of FIG. 1.

In various embodiments, if it is determined in step 706 that the IQE (e.g., IQI) is greater than the predetermined threshold level, then the process returns to step 704 in a new iteration.

Conversely, in various embodiments, if it is instead determined that the IQE (e.g., IQI) is less than or equal to the predetermined threshold value, then a notification is provided to the user (step 708). Specifically, in certain embodiments, instructions are provided from the e-pallet 102 to the user 100 for the user to take one or more actions to improve the vision signal. For example, in certain embodiments, the user 100 may be requested to clean the camera 122. In certain embodiments, these instructions may be provided by the speaker 126 in accordance with instructions provided by one or more processors (such as the processor 142 and/or processor 172 of FIG. 1).

Also as depicted in FIG. 7, in various embodiments audio data 710 from the user 110 is captured via one or more microphones 124 of the e-pallet 102. In various embodiments, the audio data 710 includes captured microphone recordings as to the verbal utterances or commands of the user 110.

In various embodiments, acoustic signal characterization is performed on the audio data 710 (step 712). In various embodiments, this is performed by the processor 142 of the e-pallet 102 of FIG. 1, and/or in certain embodiments by the processor 172 of the remote server 106 of FIG. 1. In various embodiments, the acoustic signal characterization yields a sound pressure level measure (SPL) 713 for the audio signal.

In various embodiments, a determination is made as to whether the acoustic signal is noisy (step 714). In various embodiments, this determination is made by one or more processors (such as the processor 142 and/or processor 172 of FIG. 1) as to whether the SPL 713 is greater than a predetermined threshold level that is stored in the memory 144 and/or 174 of FIG. 1.

In various embodiments, if it is determined that the acoustic signal is not noisy (e.g., that the SPL 713 is less than or equal to the predetermined threshold level), then the process proceeds to step 718, described further below.

Conversely, in various embodiments, if it is instead determined that the signal is noisy (e.g., that the SPL 713 is greater than predetermined threshold level), then a notification is provided to the user (step 716). Specifically, in certain embodiments, instructions are provided from the e-pallet 102 to the user 100 for the user to take one or more actions to improve the audio signal. For example, in certain embodiments, the user 100 may be requested to speak louder. In certain embodiments, these instructions may be provided by the speaker 126 in accordance with instructions provided by one or more processors (such as the processor 142 and/or processor 172 of FIG. 1).

Also as depicted in FIG. 7, in various embodiments motion data 707 from the user 110 is captured via one or more electronic wearable devices 111 of the user 110. In various embodiments, the motion data 707 includes captured motion data from the wearable electronic devices 111 as to motions of the user 110, such as the user making hand gestures.

In various embodiments, a locating engine is performed for the motion data (step 718). In various embodiments, the locating engine is performed by one or more processors, such as the processor 142 and/or processor 172 of FIG. 1.

Also in various embodiments, the locating engine yields both an orientation 719 and location 725 for the user 110 in relation to the microphone 124 of the e-pallet 102.

In various embodiments, a determination is made as to whether the user appears to be disoriented with respect to the microphone (step 720). In certain embodiments, this determination comprises a determination as to whether the user 110 is facing the microphone 124 (in which case the user 110 is considered to be properly oriented), or rather whether the user 110 is facing away from the microphone 124 (in which case the user 110 is considered to be disoriented). In various embodiments, this determination is made by one or more processors (such as the processor 142 and/or processor 172 of FIG. 1) based on the orientation 719.

In various embodiments, if it is determined that the user is not disoriented, then the process proceeds to step 722. In various embodiments, during step 722, no further action is taken for the process 700.

Conversely, if it is instead determined that the user is disoriented, then the process proceeds instead to step 724. In various embodiments, during step 724, a notification is provided to the user. Specifically, in certain embodiments, instructions are provided from the e-pallet 102 to the user 100 for the user 110 to face the microphone 124. In certain embodiments, these instructions may be provided by the speaker 126 in accordance with instructions provided by one or more processors (such as the processor 142 and/or processor 172 of FIG. 1).

In various embodiments, a determination is also made as to whether the user appears to be relatively far away from the microphone (step 726). In certain embodiments, this determination comprises a determination as to whether a distance between the user 110 and the microphone 124 is greater than a predetermined threshold value. In various embodiments, this determination is made by one or more processors (such as the processor 142 and/or processor 172 of FIG. 1) based on the orientation 719.

In various embodiments, if it is determined that the user is not relatively far from the microphone (e.g., such that the distance between the user 110 and the microphone 124 is less than or equal to the predetermined threshold value of step 726), then the process proceeds to the above-described step 720 in a new iteration.

Conversely, in various embodiments, if it is instead determined that the user is relatively far from the microphone (e.g., such that the distance between the user 110 and the microphone 124 is greater than the predetermined threshold value of step 726), then the process proceeds instead to step 727. In various embodiments, during step 727, a notification is provided to the user. Specifically, in certain embodiments, instructions are provided from the e-pallet 102 to the user 100 for the user to move closer to the microphone 124. In certain embodiments, these instructions may be provided by the speaker 126 in accordance with instructions provided by one or more processors (such as the processor 142 and/or processor 172 of FIG. 1).

Figure 8:
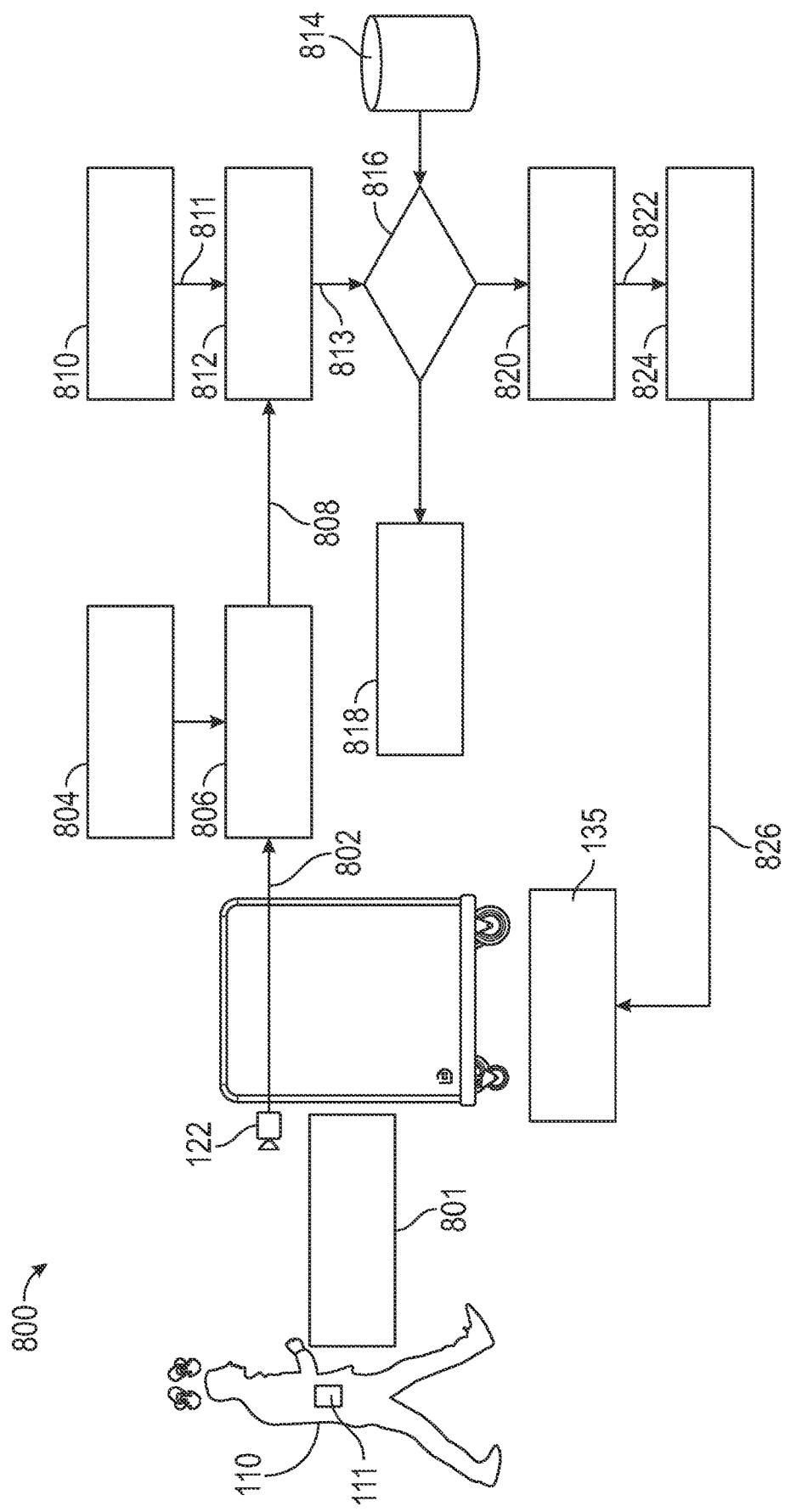
FIG. 8 is a flow diagram depicting an exemplary implementation of the process of FIG. 2 in which the e-pallet is controlled in accordance with gesture inputs from a user, in accordance with an exemplary embodiment.

FIG. 8 is a flow diagram depicting another exemplary implementation of the process 200 of FIG. 2 in which the e-pallet is controlled in accordance with gesture inputs from a user, in accordance with an exemplary embodiment. In various embodiments, the process 800 can similarly be implemented in connection with the system 100 of FIG. 1.

As depicted in FIG. 8, in various embodiments the user 110 provides a gesture command 801. In various embodiments, the gesture command comprises a hand gesture command.

Also as depicted in FIG. 8, in various embodiments, vision images 802 are obtained as to the gestures. In various embodiments, the vision images 802 are obtained via one or more cameras 122 of the e-pallet 102.

In various embodiments, hand keypoint recognition is performed (step 806). Specifically, in various embodiments, hand keypoint recognition is performed for the vision images 802 via a processor (such as the processor 142 and/or processor 172 of FIG. 1) using mesh model matching 804. In various embodiments, the mesh model matching utilizes one or more depth-based and/or deep-learning based post-estimation techniques, such as OpenPose, DeepPose, and/or Multiview bootstrapping techniques. Also in various embodiments, the hand keypoint recognition yields various keypoints 808, for example that may include two dimensional and three dimensional keypoints for the hand of the user 110.

Also in various embodiments, gesture classification is performed (step 812). Specifically, in various embodiments, gesture classification is performed via a processor (such as the processor 142 and/or processor 172 of FIG. 1) using one or more pretrained models. In certain embodiments, the pretrained models include one or more pretrained cloud and/or edge machine learning (ML) models. Also in various embodiments, the gesture classification yields a recognized gesture 813 from the user 110.

In various embodiments, a determination is made as to whether there is a gesture match (step 816). Specifically, in various embodiments, a determination is made via a processor (such as the processor 142 and/or processor 172 of FIG. 1) as to whether the recognized gesture 813 matches one of a plurality of authorized gestures 814 that are stored in memory (such as the memory 144 and/or memory 174 of FIG. 1). In certain embodiments, the authorized gestures 814 may include factory-default gestures that apply to any number of users. In certain other embodiments, the authorized gestures 814 may be programmed by the individual user 110. In certain embodiments, the authorized gestures 814 may include the various known gestures 217 described above in connection with step 216 of FIG. 2.

In various embodiments, if it is determined in step 816 that there is not a match, then the process proceeds to step 818. In various embodiments, during step 818, there are no alerts provided as to a match. In certain embodiments, accordingly the user's gesture command 801 is not utilized for controlling the e-pallet 102.

Conversely, in various embodiments, if it is instead determined in step 816 that there is a match, then the process proceeds instead to step 820. During step 820, gesture control mapping, yielding a control command 822 corresponding to the gesture command 801 provided by the user 110. In various embodiments, this is performed via a processor (such as the processor 142 and/or processor 172 of FIG. 1).

Also in various embodiments, the control command 822 is implemented (step 824). Specifically, in various embodiments, the control command 822 is implemented via instructions provided by a processor (such as the processor 142 and/or processor 172 of FIG. 1) of an e-pallet control module that are provided thereby to the e-pallet actuators 135 for control of the e-pallet 102. In various embodiments, the e-pallet actuators 135 cause movement of the e-pallet 102 in the manner (e.g., direction) requested by the user 110 as reflected in the gesture command 801.

Figure 9:
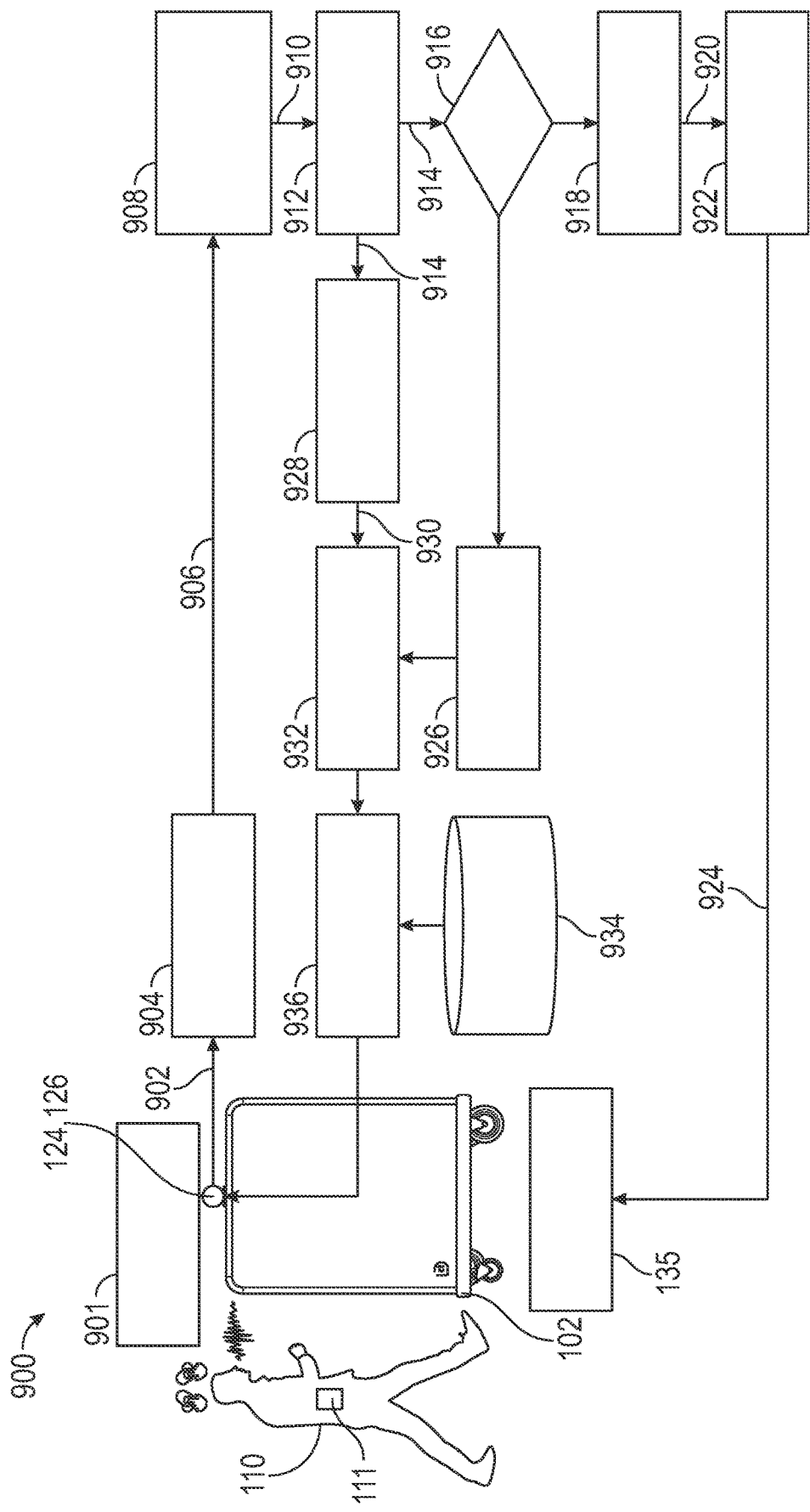
FIG. 9 is a flow diagram depicting an exemplary implementation of the process of FIG. 2 in which the e-pallet is controlled in accordance with voice inputs from a user, in accordance with an exemplary embodiment.

FIG. 9 is a flow diagram depicting an exemplary implementation of the process 200 of FIG. 2 in which the e-pallet is controlled in accordance with voice inputs from a user, in accordance with an exemplary embodiment. In various embodiments, the process 900 can similarly be implemented in connection with the system 100 of FIG. 1.

As depicted in FIG. 9, in various embodiments the user 110 provides a voice command 901. Also as depicted in FIG. 9, in various embodiments, acoustic utterances 902 are obtained as to the voice commands 901 via one or more microphones 124 of the e-pallet 102.

In various embodiments, speech enhancement is performed (step 904). Specifically, in various embodiments, speech enhancement is performed for the acoustic utterances 902 via a processor (such as the processor 142 and/or processor 172 of FIG. 1). Also in various embodiments, the speech enhancement yields an enhanced acoustic signal 906.

Also in various embodiments, speech recognition is performed (step 908). In various embodiments, the speech recognition is performed via a processor (such as the processor 142 and/or processor 172 of FIG. 1) using one or more speech recognition engines. Also in various embodiments, the speech recognition yields a recognized text 910 from the user 110.

In various embodiments, language understanding is performed (step 912). In various embodiments the language understanding is performed on the recognized text 910 via a processor (such as the processor 142 and/or processor 172 of FIG. 1), yielding a recognized command 914.

In various embodiments, a determination is made as to whether there is a recognized command match (step 916). Specifically, in various embodiments, a determination is made via a processor (such as the processor 142 and/or processor 172 of FIG. 1) as to whether the recognized command 914 matches one of a plurality of authorized voice commands that are stored in memory (such as the memory 144 and/or memory 174 of FIG. 1). In certain embodiments, the authorized voice commands may include factory-default voice commands that apply to any number of users. In certain other embodiments, the authorized voice commands may be programmed by the individual user 110.

In various embodiments, if it is determined in step 916 that there is not a match, then the process proceeds to step 926. In various embodiments, during step 926, there are no alerts provided as to a match. In certain embodiments, accordingly the user's voice command 901 is not utilized for controlling the e-pallet 102. In various embodiments, the process proceeds to step 932, described further below.

Conversely, in various embodiments, if it is instead determined in step 916 that there is a match, then the process proceeds instead to step 918. During step 918, voice command control mapping, yielding a control command 920 corresponding to the voice command 901 provided by the user 110. In various embodiments, this is performed via a processor (such as the processor 142 and/or processor 172 of FIG. 1).

Also in various embodiments, the control command 920 is implemented (step 922). Specifically, in various embodiments, the control command 920 is implemented via instructions provided by a processor (such as the processor 142 and/or processor 172 of FIG. 1) of an e-pallet control module that are provided thereby to the e-pallet actuators 135 for control of the e-pallet 102. In various embodiments, the e-pallet actuators 135 cause movement of the e-pallet 102 in the manner (e.g., direction) requested by the user 110 as reflected in the voice command 901.

With reference back to step 912, in various embodiments the recognized command 914 is also used for dialog management (step 928). In various embodiments, dialog management is performed by putting together the recognized command 914 in the context of other speech made by the user 110 and/or other circumstances involved (e.g., a type of facility in which the e-pallet 102 and the user 110 are located, and so on). In various embodiments, this step is performed by a processor (such as the processor 142 and/or processor 172 of FIG. 1), and yields an intended conversation 930.

Also in various embodiments, language generation is performed (step 932). In various embodiments, during step 932, a processor (such as the processor 142 and/or processor 172 of FIG. 1) utilizes the intended conversation 930 (and in certain embodiments any additional details pertaining to the no match alert of step 926) in performing the language generation for storage in memory for future use. Also in various embodiments, the language generation is combined with other data from an audio database (e.g., stored in the memory 144 and/or memory 174 of FIG. 1) via processor (such as the processor 142 and/or processor 172 of FIG. 1) in generating a text to speech engine (step 936) for use in subsequent iterations of the process 900 of FIG. 9. In certain embodiments, the process 900 then terminates ore repeats.

Accordingly, methods, and systems are provided for control of an e-pallet (and/or for control of one or more other types of moving platforms). As described in greater detail above, in various embodiments, vision recognition, audio recognition, and wearable device motion recognition are each utilized in interpreting and implementing the instructions and commands from a user of one or more e-pallets in accordance with various implementations.

It will be appreciated that the systems, methods, and implementations may vary from those depicted in the Figures and described herein. For example, in various embodiments, the system 100 (e.g., including the e-pallet 102, the user 110, the communications network 108, and/or the remote server 106), components thereof, and/or other components may differ from those depicted in FIG. 1 and/or described above in connection therewith. It will also be appreciated that the steps of the processes of FIGS. 2-9 may differ, and/or that various steps thereof may be performed simultaneously and/or in a different order, than those depicted in FIGS. 2-9 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling movement of one or more e-pallets using multi-modal interaction with a user of the one or more e-pallets, the method comprising:
   obtaining, via one or more first sensors, first sensor data of a first modality pertaining to a command from the user for movement of the one or more e-pallets;
   obtaining, via one or more second sensors, second sensor data of a second modality, different from the first modality, pertaining to the command;

determining, via a processor, an intended movement of the one or more e-pallets based on both the first sensor data and the second sensor data; and moving the one or more e-pallets in executing the intended movement, in accordance with instructions provided by the processor to one or more actuators of the one or more e-pallets.

2. The method of claim 1, wherein:

the step of obtaining the first sensor data comprises obtaining vision sensor data via one or more cameras of the one or more e-pallets as to a hand gesture provided by the user;

the step of obtaining the second sensor data comprises obtaining audio sensor data via one or more microphones of the one or more e-pallets as to a verbal command provided by the user; and the step of determining the intended movement comprises determining, via the processor, the intended movement of the one or more e-pallets based on both the vision sensor data and the audio sensor data.

3. The method of claim 2, further comprising:

determining, via the processor, an image quality associated with the vision sensor data;

wherein the use of the vision sensor data for determining the intended movement and the moving of the one or more e-pallets is based at least in part on the image quality associated with the vision sensor data.

4. The method of claim 3, further comprising:

providing instructions, via the processor, for the user to face the one or more cameras, move closer toward the one or more cameras, or both, when the image quality is less than a predetermined threshold.

5. The method of claim 2, further comprising:

determining, via the processor, a sound quality associated with the audio sensor data;

wherein the use of the audio sensor data for determining the intended movement and the moving of the one or more e-pallets is based at least in part on the sound quality associated with the audio sensor data.

6. The method of claim 5, further comprising:

providing instructions, via the processor, for the user to face the one or more microphones, move closer toward the one or more microphones, or both, when the sound quality is less than a predetermined threshold.

7. The method of claim 2, further comprising:

obtaining motion sensor data via one or more additional sensors from an electronic wearable device of the user;

wherein the step of determining the intended movement comprises determining, via the processor, the intended movement of the one or more e-pallets based on the vision sensor data, the audio sensor data, and the motion sensor data.

8. The method of claim 1, wherein the one or more e-pallets comprise a plurality of e-pallets, and the method further comprises:

initiating, via instructions provided by the processor, one or more elevator modes of operation for the plurality of e-pallets when entering and exiting an elevator, the one or more elevator modes of operation including a switching of roles of the plurality of e-pallets between a leader role and one or more follower roles.

9. The method of claim 1, wherein the one or more e-pallets comprise a plurality of e-pallets, and the method further comprises:

initiating, via instructions provided by the processor, one or more dead end modes of operation for the plurality of e-pallets when approaching a dead end in a path in which the plurality of e-pallets are travelling, the one or more dead end modes of operation including a switching of roles of the plurality of e-pallets between a leader role and one or more follower roles.

10. A system for controlling movement of one or more e-pallets using multi-modal interaction with a user of the one or more e-pallets, the system comprising:

one or more first sensors configured to obtain first sensor data of a first modality pertaining to a command from the user for movement of the one or more e-pallets;

one or more second sensors configured to obtain second sensor data of a second modality, different from the first modality, pertaining to the command; and a processor that is coupled to the one or more first sensors and the one or more second sensors, the processor configured to at least facilitate:

determining an intended movement of the one or more e-pallets based on both the first sensor data and the second sensor data; and moving the one or more e-pallets in executing the intended movement, in accordance with instructions provided by the processor to one or more actuators of the one or more e-pallets.

11. The system of claim 10, wherein:

the one or more first sensors comprise one or more cameras configured to obtain vision sensor data as to a hand gesture provided by the user;

the one or more second sensors comprise one or more microphones configured to obtain audio sensor as to a verbal command provided by the user; and the processor is configured to at least facilitate determining the intended movement of the one or more e-pallets based on both the vision sensor data and the audio sensor data.

12. The system of claim 11, wherein the processor is configured to at least facilitate:

determining an image quality associated with the vision sensor data; and using the vision sensor data for determining the intended movement and the moving of the one or more e-pallets based at least in part on the image quality associated with the vision sensor data.

13. The system of claim 12, wherein the processor is configured to at least facilitate:

providing instructions for the user to face the one or more cameras, move closer toward the one or more cameras, or both, when the image quality is less than a predetermined threshold.

14. The system of claim 11, wherein the processor is configured to at least facilitate:

determining a sound quality associated with the audio sensor data; and using the audio sensor data for determining the intended movement and the moving of the one or more e-pallets based at least in part on the sound quality associated with the audio sensor data.

15. The system of claim 14, wherein the processor is configured to at least facilitate:

providing instructions for the user to face the one or more microphones, move closer toward the one or more microphones, or both, when the sound quality is less than a predetermined threshold.

16. The system of claim 11, further comprising:

one or more additional sensors configured to obtain motion sensor data from an electronic wearable device of the user;

wherein the processor is configured to at least facilitate determining the intended movement of the one or more e-pallets based on the vision sensor data, the audio sensor data, and the motion sensor data.

17. The system of claim 10, wherein the one or more e-pallets comprise a plurality of e-pallets, and the processor is configured to at least facilitate:
   initiating, via instructions provided by the processor, one or more elevator modes of operation for the plurality of e-pallets when entering and exiting an elevator, the one or more elevator modes of operation including a switching of roles of the plurality of e-pallets between a leader role and one or more follower roles.

18. The system of claim 10, wherein the one or more e-pallets comprise a plurality of e-pallets, and the processor is configured to at least facilitate:
   initiating, via instructions provided by the processor, one or more dead end modes of operation for the plurality of e-pallets when approaching a dead end in a path in which the plurality of e-pallets are travelling, the one or more dead end modes of operation including a switching of roles of the plurality of e-pallets between a leader role and one or more follower roles.

19. An e-pallet device comprising:
   a body;
   a plurality of actuators disposed on or within the body;
   one or more cameras disposed on or within the body and configured to obtain vision sensor data pertaining to a command from a user for movement of the body as represented via a hand gesture of the user;
   one or more microphones disposed on or within the body and configured to obtain audio sensor data pertaining to the command as represented via an audible utterance of the user; and
   a processor that is coupled to the one or more cameras, the one or more microphones, and the plurality of actuators, the processor configured to at least facilitate:
      determining an intended movement of the e-pallet device based on both the vision sensor data and the audio sensor data; and
      moving the e-pallet device in executing the intended movement, in accordance with instructions provided by the processor to the plurality of actuators and that are implemented via the plurality of actuators.

20. The e-pallet device of claim 19, further comprising:
   one or more additional sensors configured to obtain motion sensor data from an electronic wearable device of the user;
   wherein the processor is configured to at least facilitate determining the intended movement of the e-pallet device based on the vision sensor data, the audio sensor data, and the motion sensor data.

* * * * *